US010565626B2

(12) United States Patent
Seljan et al.

(10) Patent No.: US 10,565,626 B2
(45) Date of Patent: Feb. 18, 2020

(54) METHODS AND SYSTEMS FOR DYNAMIC AUCTION FLOORS

(71) Applicant: AppNexus Inc., New York, NY (US)

(72) Inventors: Samuel Seljan, Portland, OR (US); Michael McNeeley, Brooklyn, NY (US); Arel Lidow, New York, NY (US); Yaron Lissack, Great Neck, NY (US); Sandesh Devaraju, Brooklyn, NY (US); Andrew Sweeney, Brooklyn, NY (US)

(73) Assignee: Xandr Inc., New York, NY (US)

( * ) Notice: Subject to any disclaimer, the term of this patent is extended or adjusted under 35 U.S.C. 154(b) by 0 days.

(21) Appl. No.: 14/661,695

(22) Filed: Mar. 18, 2015

(65) Prior Publication Data

US 2016/0275570 A1 Sep. 22, 2016

(51) Int. Cl.
 G06Q 30/02 (2012.01)

(52) U.S. Cl.
 CPC ................ G06Q 30/0275 (2013.01)

(58) Field of Classification Search
 CPC ................................................ G06Q 30/0275
 USPC .................... 705/14.71, 37, 14.45
 See application file for complete search history.

(56) References Cited

U.S. PATENT DOCUMENTS

| 5,168,451 A * | 12/1992 | Bolger | G08G 1/127 |
| | | | 340/994 |
| 2008/0054072 A1* | 3/2008 | Katragadda | G08G 1/123 |
| | | | 235/384 |
| 2009/0199230 A1* | 8/2009 | Kumar | G06Q 30/02 |
| | | | 725/32 |
| 2010/0036728 A1* | 2/2010 | Pechenick | G06Q 30/0249 |
| | | | 705/14.48 |
| 2010/0145809 A1* | 6/2010 | Knapp | G06Q 30/02 |
| | | | 705/14.71 |
| 2011/0231264 A1* | 9/2011 | Dilling | G06Q 30/02 |
| | | | 705/14.71 |
| 2013/0097028 A1* | 4/2013 | Han | G06Q 30/02 |
| | | | 705/14.71 |
| 2014/0122253 A1* | 5/2014 | Vassilvitskii | G06Q 30/0275 |
| | | | 705/14.71 |

(Continued)

FOREIGN PATENT DOCUMENTS

WO WO-2013070491 A1 * 5/2013

OTHER PUBLICATIONS

Jorge Balat, Identification and Estimation of Dynamic Auctions with Unobserved Heterogeneity, 2013 (Year: 2013).*

Primary Examiner — Tarek Elchanti
(74) Attorney, Agent, or Firm — Guntin & Gust, PLC; Ralph Trementozzi

(57) ABSTRACT

Systems and methods for optimizing floor prices in real-time bidding auctions are described. Upon receiving a request for an advertisement to be served to an impression consumer, the value of the consumer can be determined based, for example, on historical bid prices in prior auctions. A maximum floor price for the current auction to serve the impression us calculated based at least in part on the value of the impression consumer and one or more attributes associated with the auction. The auction is held using the calculated floor price, which can be adjusted based on an aggressiveness factor, and the winner of the auction can be determined based on the floor price.

24 Claims, 5 Drawing Sheets

(56) References Cited

U.S. PATENT DOCUMENTS

2014/0172587 A1\* 6/2014 Somech ............. G06Q 30/0275
  705/14.71
2015/0332310 A1\* 11/2015 Cui .................... G06Q 30/0244
  705/14.45

\* cited by examiner

METHODS AND SYSTEMS FOR DYNAMIC AUCTION FLOORS

BACKGROUND

The present disclosure relates generally to online advertising auctions and, more particularly, to systems and methods for optimizing floor prices in auctions to serve advertisements to impression consumers.

Current yield management offerings in the online ad auction space tend to either lack functionality or be overly complex and difficult to optimize for best results. For impression sellers, complicated yield management rules and unsophisticated floor pricing logic make revenue maximization more of a guessing game than an educated endeavor. Further, impression buyers often find floor pricing mechanisms to be confusing black boxes and prefer pure second price auctions instead. However, uniform auction logic is unlikely to be both efficient and incentive-compatible to all buyers and all sellers in all situations. For example, although buyers typically prefer second price auctions to first price auctions, second price auctions with revenue-maximizing hard floors are generally worse for most buyers because they reduce delivery. Moreover, many sellers prefer to retain the advantages derived from complex yield management rules.

BRIEF SUMMARY

Systems and methods for optimizing floor prices in real-time bidding auctions are described. In one aspect, a computer-implemented method includes: receiving a request for an advertisement to be served to an impression consumer; determining, by a computing device having a processing unit, a value of the impression consumer; and calculating, by a computing device having a processing unit, a maximum floor price for a real-time bidding auction to serve the impression based at least in part on the value of the impression consumer and one or more attributes associated with the auction.

In one implementation, the value of the impression consumer comprises a value of the impression consumer to one of a particular impression seller and a plurality of impression sellers. The value of the impression consumer can be determined based at least in part on one or more recent bids to serve an advertisement to the impression consumer. The attributes associated with the auction can include one or more of time, day, publisher, average price for the impression, advertisement viewing history of the impression consumer, browsing history of the impression consumer, and inventory characteristics. The maximum floor price can be a hard floor.

In another implementation, determining the value of the impression consumer includes the steps of: determining that the impression consumer cannot be identified; identifying a geography associated with the impression consumer; and determining the value of the impression consumer based on a value of other unidentified impression consumers associated with the geography. Determining the value of the impression consumer can also include calculating in substantially real time a moving average based on a current user value and one or more previously determined user values. The value of the impression consumer can be determined based in part on a highest bid price and a second-highest bid price from bids received in one or more previous real-time bidding impression auctions.

In a further implementation, the method includes the step of calculating a weighted average of the highest bid price and the second-highest bid price, where the value of the impression consumer is determined based in part on the weighted average. Calculating the maximum floor price can include determining a function that maximizes revenue based at least in part on the value of the impression consumer and one or more attributes associated with the auction. The revenue can be determined based on a second price auction function. Further, the maximum floor price can be calculated in real time during the real-time bidding auction.

Other implementations of the above aspect include corresponding systems and computer programs. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
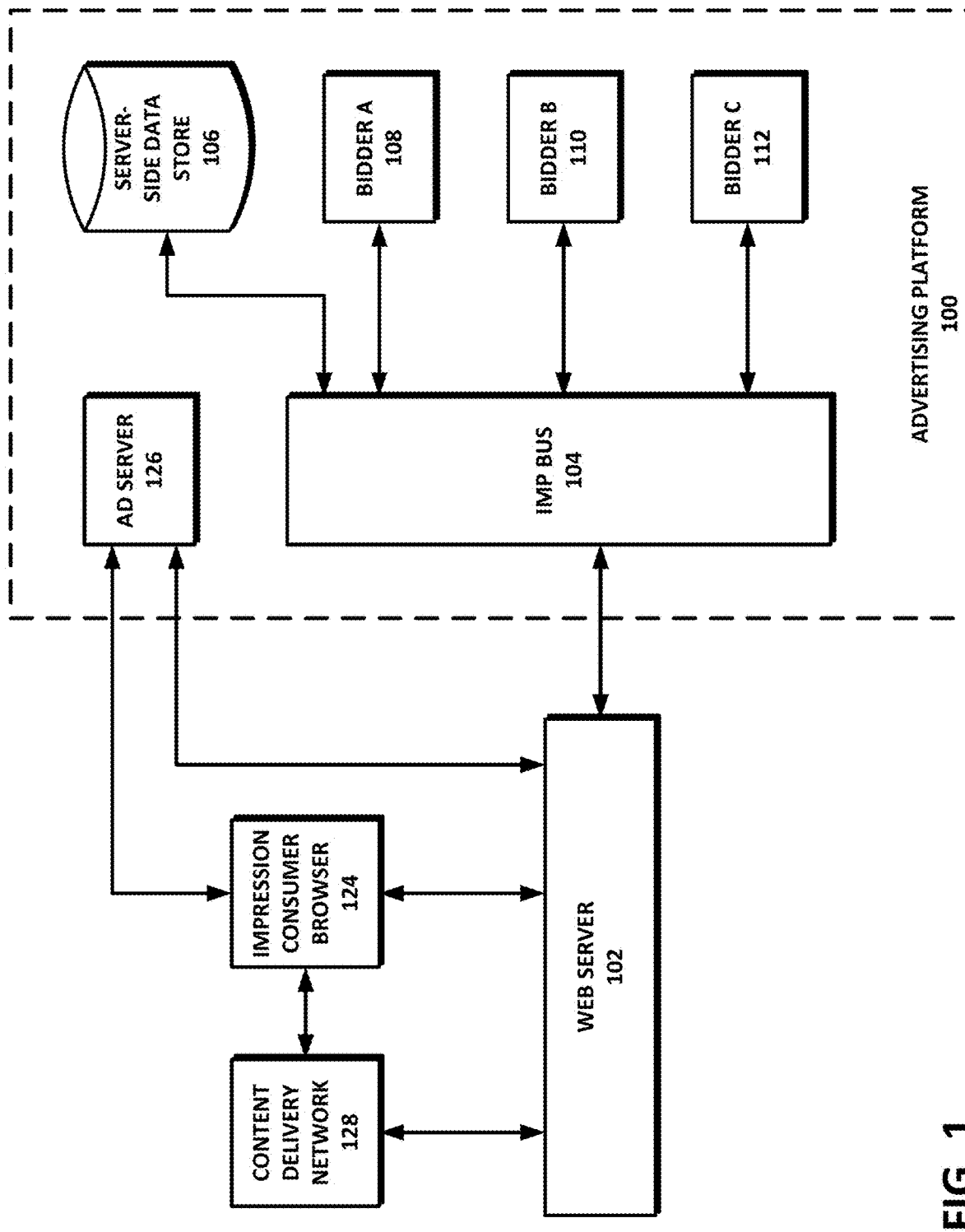
FIG. 1 is a high-level system architecture diagram of components of an online advertising platform with support for real-time bidding auctions according to an implementation.

Described herein in various implementations are systems and methods for optimizing floor prices in online advertising auctions. Referring to FIG. 1, an advertising platform 100 that provides for the execution of real-time bidding auctions for impression inventory and eases collaboration among members of the online advertising industry can include a platform impression bus 104 (also referred to herein as the "Imp Bus") that facilitates the transactional aspects of impression inventory trading. In general, the Imp Bus 104 processes ad requests, feeds data to platform members, conducts impression auctions, returns ads to publishers, tracks billing and usage, returns auction result data, and enforces quality standards.

Parties that interface with the advertising platform 100 can include impression sellers, which are persons or entities that sell impression inventory (e.g., available ad space on websites, in mobile applications, etc.) and impression buyers, which are persons or entities that purchase impression inventory and can serve creatives (e.g., images, videos, and other forms of advertisements) in the purchased inventory to impression consumers. Impression buyers can include advertisers, advertising networks, advertising agencies, advertising exchanges, and publishers. In an auction for an impression, an impression buyer can bid for the impression using a computer-based bidder that receives as input various data related to the impression, the impression consumer, and/or other data and generates as output a bid price.

In some implementations of the advertising platform 100, a server-side data store 106 within the platform 100 stores data associated with particular impression consumers (e.g., demographics, ad viewing history, etc.), which can be used as input to bidders in impression auctions when a recognized impression consumer is the target audience. In general, data that is stored in association with impression consumers can be supplemented over the course of time as the impression consumers interact with web delivery engines within the platform.

In some implementations, all data stored in association with a particular impression consumer is shared among all parties interfacing with the advertising platform 100, whereas, in other implementations, mechanisms limit access to the data stored in association with a particular impression consumer based on certain criteria. For example, certain impression trading industry members may have contractual agreements that provide for sharing of data stored in association with a particular set (or sets) of impression consumers. In another example, the advertising platform 100 provides functionality that relies on impression consumer data created by or derived from information generated by unrelated parties, but does not permit the data and/or underlying information to be shared among the parties absent other agreement In one implementation of the advertising platform 100, each bidder is assigned a client-side data store (e.g., cookie space) in each impression consumer's browser. A bidder can freely push and pull data into or out of its own client-side data store on each impression or pixel call. For instance, a bidder may wish to track the number of times a creative has been shown to a particular impression consumer or the most recent time an ad was shown to that consumer. The data pushed into a particular bidder's client-side data store is passed into requests for that bidder only, absent an agreement to allow the sharing of data with other bidders.

In one example of operation, an impression seller hosts a website on a web server 102. The website can provide a number of creative serving opportunities, each of which can be associated with a platform-specific ad tag. The web server 102 receives requests for webpages generated by an impression consumer's web browser 124. If a requested page includes one or more creative serving opportunities, the web server 102 makes an ad call to the advertising platform 100 by redirecting the page request to the Imp Bus 104. The Imp Bus 104 can examines a browser header of the page request to determine if information identifying the impression consumer (e.g., an identifier stored in cookie space) is included therein.

If the impression consumer is identified, the Imp Bus 104 can retrieve information associated with the consumer from a server-side data store 106 within the advertising platform 100. The Imp Bus 104 or other platform subsystem generates one or more bid requests that each provide characterizations of one or more of the creative-serving opportunities on the requested page. In general, a particular bid request can include information that characterizes the impression consumer (e.g., based on data retrieved from the server-side data store 106) and the ad space (e.g., based on information associated with the platform-specific ad tag itself, such as data identifying and/or characterizing the impression, the impression seller, or the impression inventory source, and so on). A unique bid request can be created for each bidder or, if sharing of data is permitted between one or more bidders, those bidders can be sent the same bid request.

The Imp Bus 104 sends the bid requests to each respective bidder 108, 110, 112 within the platform 100. The information included in each bid request can be used by each bidder 108, 110, 112 to generate a real-time bid response on behalf of an impression buyer or buyers associated with each bidder 108, 110, 112 and to return bid responses to the Imp Bus 104. Each bid response identifies a bid price and a creative that is to be served to the impression consumer should the bid be identified as the winning bid of the platform-based auction. In the instance where a particular bidder is associated with multiple impression buyers, the bidder can conduct an internal auction to identify a winning bid from amongst the eligible campaigns of its associated impression buyers, and to generate a bid response for the platform-based auction based on the result of the internal auction.

The Imp Bus 104 identifies a winning bid from among the bid responses returned by the bidders 108, 110, 112. Although, in many instances, the winning bid is the bid associated with the highest dollar value, and the best price for a creative serving opportunity is the price that yields the highest revenue for the impression seller, there are instances in which the winning bid and the best price are based on other metrics, such as ad frequency. The Imp Bus 104 returns a uniform resource locator (URL) that identifies the location of a creative associated with the winning bid to the web server 102. In the depicted example, the web server 102 returns the requested page to the impression consumer's web browser 124, which, using information provided in the page, retrieves the ad creative to be served from an ad server 126 within the platform 100 or a server of a content delivery network 128.

Implementations of the advertising platform 100 can utilize appropriate hardware or software and can execute, for example, on server class computers that have sufficient memory, data storage, and processing power and that run a server class operating system (e.g., Oracle® Solaris®, GNU/Linux®, and the Microsoft® Windows® family of operating systems). The software, for example, can be implemented on a general purpose computing device in the form of a computer including a processing unit, a system memory, and a system bus that couples various system components including the system memory to the processing unit.

The advertising platform 100 can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

A communications network can connect the advertising platform 100, web server 102, content delivery network 128, and/or impression consumer browser 124. Communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications and HTTP/HTTPS requests made by a web browser. Other communication protocols are contemplated.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

In some implementations, an impression seller belonging to the advertising platform 100 establishes a yield management profile to define yield management rules to be applied to impression buyers bidding on its inventory. In some cases, the rules defined by the yield management profile protect against channel conflict and price erosion. In other cases, the rules defined by the yield management profile attempt to capture additional yield for high value users or inventory.

Yield management rules can include buyer biases. Buyer biases provide for a bias to be applied to the bid price of certain impression buyers. A bias can be a percentage bias or a cost-per-mille (CPM)-based bias, (e.g., an additive bias) and can be either a positive or a negative bias. A bias can be applied to a bid originating from specific impression buyers (e.g., impression buyers whose brands a publisher wants to favor or disfavor in an auction) or to a bid originating from impression buyers in a particular group of buyers.

In operation, the Imp Bus 104 can apply bias rules stored in a yield management profile to bids as appropriate. For example, a bid of $1.00 for a buyer with a CPM bias of +$0.05 will be sent to the impression auction with a value of $1.05. Similarly, if the impression buyer submitting the bid has a bid bias of type percentage, the bid price is multiplied by the bias percentage for comparison of bids in the auction. Subsequent to the auction, the bias can be removed from the bid price.

In some implementations, modifiers are used to adjust biases and/or price floors (further described below) based on additional criteria, such as impression consumer attributes or technical attributes of creatives or impression inventory. Impression consumer attributes can include, for instance, demographic segment to which an impression consumer belongs (e.g., based on age, gender, or salary range), a geographic location of the impression consumer, or a browsing history of the impression consumer (e.g., how frequently or recently the impression consumer has viewed a particular creative). Technical attributes can include, for instance, technical attributes of a creative, such as its file type (e.g., image, Flash, video, or text), its file size (e.g., greater than 40 k), or its mode of display (e.g., an expandable creative), or technical attributes of impression inventory, such as the physical size (i.e., width×height) of the ad space. Modifiers can be used to adjust eligible biases by a CPM or a percentage, or to adjust eligible price floors by a fixed amount or a percentage.

Price floors provide impression sellers with the capability to set reserve pricing in order to manage yield. For instance, through the use of price floors, a publisher can protect its existing yield gained through direct deals or can capture additional yield for high-value impression inventory or impression consumers. Auction price floors can be set unique to, for example, inventory attributes, impression characteristics, or demand targeting criteria.

Price floors such as those contained within a yield management profile can be hard floors or soft floors. A hard floor refers to, in some implementations, an explicit reserve price that determines the lowest price at which a bid can be entered into an auction and limits price reduction to the value of the hard floor. A soft floor refers to, in some implementations, a shadow bid price that is used only to set a floor for price reduction and does not affect whether or not an impression is sold (i.e., a bid above the soft floor is reduced to the soft floor value, and bids below the soft floor are not price reduced).

In operation, after biases are applied to bids in an impression auction, the Imp Bus 104 can determine which, if any, floor to use for each bid. For example, a floor having a highest priority level and meeting certain targeting criteria (based on, e.g., the impression inventory, impression consumer, and or demand) can be selected and compared to the associated bid. If the bid meets the floor price, the bid is entered into the auction. If the selected floor also has a soft floor value, the associated bid will not be price-reduced below the soft floor price during the auction.

In one implementation, an automatic soft floor is set across all or a subset of impression auctions to prevent extreme price volatility in illiquid markets and ensure that sellers receive a fair price for their inventory. The soft floor can be an estimated clear price (ECP) soft floor, that is, a soft floor specifying a predicted value of what an ad placement (e.g., a combination of URL, geography, and ad tag) usually sells for (i.e., the price required to win most auctions on a given placement), or an estimated average price (EAP) soft floor, that is, a soft floor specifying a historical value of what an ad placement has sold for on average (i.e., the price required to win an average number of auctions on a given placement). A winning bid in the auction can be reduced to the maximum of the second highest bid (plus, in some cases, a small amount such as $0.01), the hard floor, or the soft floor. When a buyer has the top eligible bid in an auction and the bid is below the soft floor, the buyer will still win the auction, but the bid is not price reduced to the second highest bid. Above the soft floor, a winning bid is reduced to the maximum of the second highest bid and the soft floor price. Comparatively, hard floors reject all bids below the floor, limiting winnable supply for buyers and also limiting price reduction to the value of the hard floor.

Auction mechanics and yield management rules can further include those described in U.S. application Ser. No. 13/049,534, filed on Mar. 16, 2011, and entitled "Advertising Bid Price Modifiers," the entirety of which is incorporated by reference herein.

In one implementation, a floor price for a real-time bidding (RTB) impression auction is determined based on a goal of maximizing impression seller revenue. Generally, higher floors should be set in auctions for valuable inventory to ensure that sellers do not miss out on potential revenue. This is important in highly variable and dynamic auction environments, where demand can ebb and flow and auctions may be held with a less than desirable number of bidders, as well as in the case of second price auctions, where the winning bid is reduced to the second highest bid price (or, in some circumstances, is reduced to a floor value). For example, if the floor is set too high, the impression may go unsold. Accordingly, the general objective is to set the floor between the first second highest bid prices in an auction. The techniques described herein achieve this goal. Advantageously, the floor price for an RTB auction can be determined substantially in real-time during the auction and on an impression by impression basis, and can be calculated based on a value associated with the impression consumer for whom the auction is held. Further still, the calculation of the floor price can include a consideration of any number of attributes associated with the impression, the impression consumer, and/or the publisher, as well as other factors such as geography and time of day.

Figure 2:
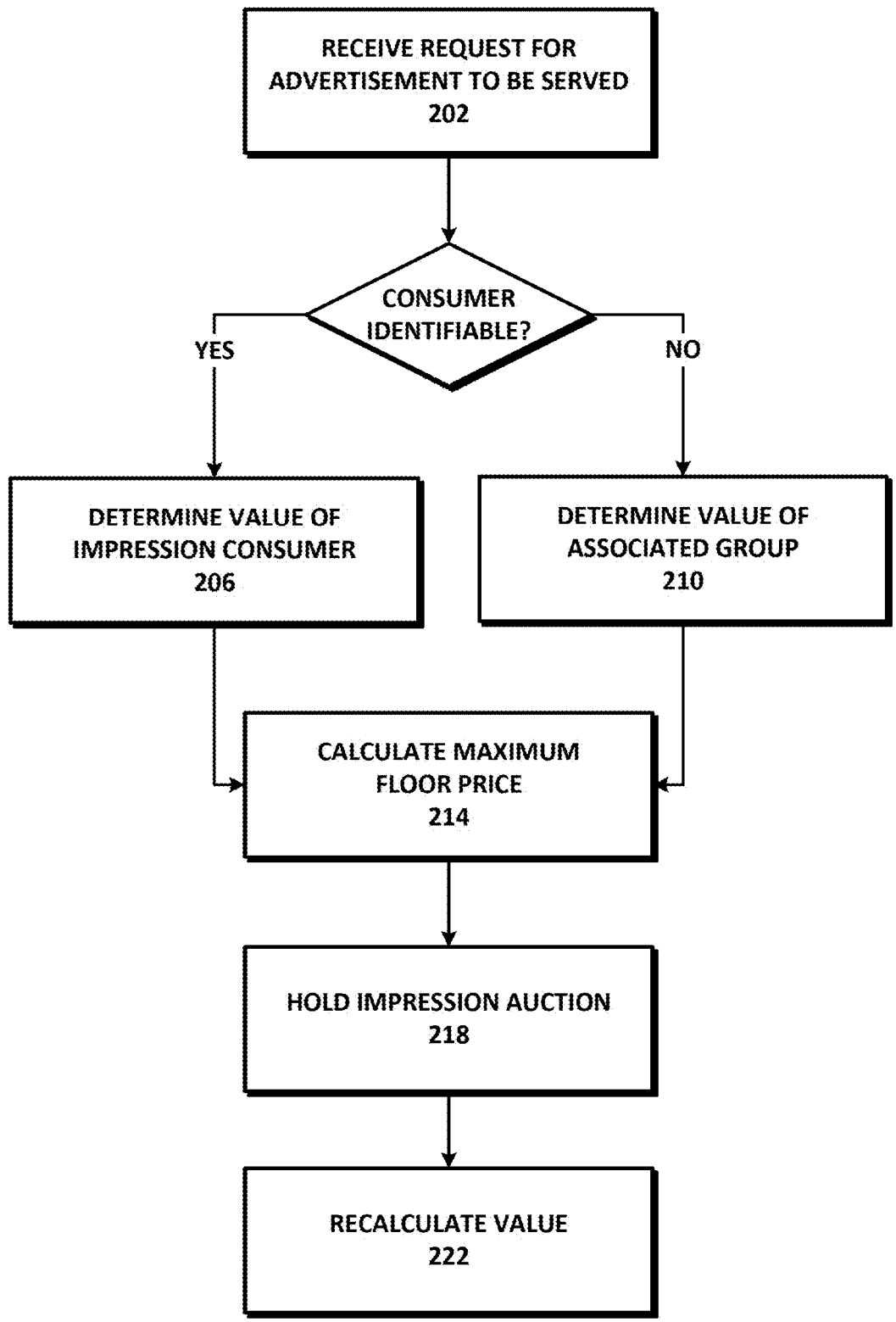
FIG. 2 is a flowchart depicting an example method for providing an optimized floor price in an auction for an advertisement to be serving to an impression consumer.

According to one implementation, and referring to FIG. 2, a method for determining an optimal floor price for an RTB auction begins with the Impression Bus 104 receiving a request for an advertisement to be served to an impression consumer (also referred to herein as a "user") (STEP 202). The request can be sourced based on, for example, a visit to a webpage having advertisement space by the impression consumer. If the impression consumer is reliably identifiable (e.g., by cookie, fingerprinting, or otherwise), the value of the impression consumer is determined by the Impression Bus 104 (STEP 206). On the other hand, if the impression consumer is not identifiable, the Impression Bus 104 determines the value associated with a group of unidentifiable impression consumers under which the consumer at issue is categorized (STEP 210). In the latter case, the unidentifiable impression consumer can be grouped based on knowable attributes, such as geography of the impression consumer or information associated with the impression inventory that is the subject of the auction. The determined impression consumer (or group) values can be stored, for example, in server-side data store 106, which can be structured so that the Impression Bus 104 can access this data quickly (on the order of milliseconds) during an RTB auction.

In STEP 214, the Impression Bus 104 calculates the maximum floor price (e.g., a hard floor) for the auction based on the impression consumer (or group) value. The calculation of the floor price can further account for other variables, such as the time, day, publisher, average price for the impression, advertisement viewing history of the impression consumer, browsing history of the impression consumer, inventory, and/or other attribute(s).

In some implementations, the "aggressiveness" of the floor price can be adjusted such that the maximum calculated floor price is modified (e.g., reduced or increased) by a particular amount or factor. For example, the advertising platform can include a user interface that allows a user (e.g., a publisher) to manually set an aggressiveness factor or an aggressiveness level that corresponds to a predefined aggressiveness factor. More specifically, by multiplying the floor by a factor Epsilon (e.g., a value between 0 and 1), the aggressiveness of the optimal floor price (i.e., the closeness to the calculated value) can be adjusted. The adjustment ensures that bidders bid truthfully. Theoretically, if the adjustment is too aggressive, bidders may theoretically lower their to compensate for fluctuations in value from what they are buying. The aggressiveness factor also allows the platform provider to slowly expose buyers to the use of optimal floors, gauge the change in seller revenue based on buyer behavior, and adjust floor aggressiveness accordingly. Although, ideally, the maximum calculated floor price is the optimal price that will produce the most revenue for the impression seller, the ability to adjust the floor aggressiveness allows the system to account for imperfect floor calculations based on incomplete data as well as, in the case of reducing the maximum floor price, allows for breathing room to avoid no bids satisfying the floor. In such a case, the calculated floor price as adjusted for aggressiveness can then be considered the maximum floor price.

In STEP 218, the Impression Bus 104 then executes the RTB auction, using the calculated (and adjusted, if applicable) floor price in determining the auction winner. In some implementations, after the auction, the Impression Bus 104 recalculates (or calculates anew) the running impression consumer (or group) value based on the recent bid information (STEP 222), so that the value can be quickly looked up for the next auction involving the impression consumer. In another implementation, the calculated floor price is used for the auction only if it is less than a hard floor manually set by an impression seller or other party. A soft floor can also be omitted from the auction (whether or not the calculated floor price is used) so that a pure second price auction can occur. These steps will now be described in further detail.

Optimal Floor Algorithm

In general, for each auction i in which floor optimization is used, the optimal floor value can be calculated using an equation similar to the following:

$$\text{opt\_floor}_i = \text{Epsilon}_p * (\text{beta0}_p + \text{beta1}_p * \text{attribute1}_i + \ldots + \text{betaN}_p * \text{attributeN}_i)$$

where each variable subscripted by i is unique to a given auction and each variable subscripted by p is set at the publisher level. In the above equation, the beta values are scalar numbers to be optimized at the publisher or placement level. The determination of these optimized values can be performed periodically (e.g., daily, sub-daily, weekly, etc.). The attributes refer to features that represent an auction. In one specific example, attributes that generate acceptable results on sampled data include the user value moving average, inventory session frequency, and external valuation, as further described herein.

In one specific implementation, for each auction i in which floor optimization is used, the optimal floor value can be calculated as follows:

$$opt\_floor_i = Epsilon_p*(beta0_p + beta1_p*user\_mean_i + beta2_p*external\_valuation_i + beta3_p*\log(inventory\_frequency_i) + beta4_p*\log(inventory\_frequency_i)^2 + beta5_p*eap_i$$

where each variable subscripted by i is unique to a given auction and variables subscripted by p are set at the publisher level. The optimal floor can also be selected as the minimum between the above equation and the result of max(5.0, 12*EAP). Similar equations can also be used for new or unidentifiable impression consumers. For example, if the impression consumer is determined to be a new user and there is no record of a previously determined user valuation (so that the user_mean, external_valuation, and inventory_ frequency values are zero), the optimal floor value can be calculated as follows:

$$opt\_floor_i = Epsilon_p*(beta6_p + beta7_p*eap_i)$$

Two attributes can be created for the new user: an attribute that the user is new, and the EAP of the auction. Beta values (beta6 and beta7, respectively) can be calculated for the two attribute values.

If the impression consumer is otherwise unidentifiable (e.g., cookieless), the optimal floor can be calculated as follows:

$$opt\_floor_i = Epsilon_p*(beta8 + beta9*eap_i)$$

As with the new user calculation, two attributes can be created for the cookieless user: an attribute that the user is cookieless, and the EAP of the auction. Beta values (beta8 and beta9, respectively) can be calculated for the two attribute values.

The above equations can optionally include minimum (min) and maximum (max) functions as a safety switch to prevent errantly calculated floors resulting from bugs in code or other unexpected factors. The values in the max function can be arbitrarily chosen as appropriate floors should the optimal floor calculation produce unexpected results. For example, the cookieless optimal floor equation can be:

$$opt\_floor_i = \min(Epsilon_p*(beta8 + beta9*eap_i), \max(1.0, 3*EAP))$$

The calculation of each variable in the above equations is further described below.

Calculating Impression Consumer Value

Because demand varies greatly across users and changes quickly, a dynamic "user_mean" value associated with each user (impression consumer) can be calculated by the present system. In some instances, a "user_mean" value is calculated for each user/seller pair such that each impression seller can have a tracked user value for each user that is unique to that seller. As such, the system can calculate in real-time before, during, or after an auction, for each user/seller combination, a signal of market demand for each user.

Machine learning modeling of log-level data on an operation advertising platform (further described below) indicates that the most recent bid and the average bid to serve an advertisement to each impression consumer are strongly indicative of future bids, especially when intelligently combined with placement level information such as EAP, hour of the week, and user session frequency. Recent bid values can be those having occurred with respect to a particular impression consumer or a group of related impression consumers over the last hour, day, number of days, week, month, or other period. Accordingly, market demand can be decomposed into two metrics: the most recent demand for the user and longer-term average demand on the user. Demand for the user can be measured, in some instances, as the weighted average of the highest and second highest eligible bids, normalized by the inventory average price. In certain implementations, demand for the user can be more specifically measured as the weighted average of the highest eligible bid where the buyer is paying per impression (on a CPM basis) and the second highest of all eligible bids, normalized by the inventory average price. In one implementation, a particular "user_mean" value is calculated as follows:

For each auction i:

$$external\_bid1[i] = \max(actual\_bid\_price[i])$$

$$external\_bid2[i] = \max(actual\_bid\_price[i] \text{ where } bid <> external\_bid1[i])$$

$$external\_valuation[i+1] = theta2*(external\_bid1[i] - eap[i]) + theta3*(external\_bid2[i] - eap[i])$$

if user_mean==null:

$$user\_mean[i+1] := (external\_valuation[i+1])$$

else:

$$user\_mean[i+1] := theta0*(external\_valuation[i]) + theta1*user\_mean[i]$$

As used above:

"actual_bid_price" is the actual bid price in an amount of currency (e.g., US dollars)*1000;

"theta0", "theta1", "theta2", and "theta3" are scalar coefficients that can be optimized via data analysis to improve the performance of the model;

"eap" is the impression inventory average price, which can be defined at various levels of granularity (e.g., average price at the ad unit-creative size-user geo level);

"external_valuation" is a market valuation for each user derived from the most recent bid values above as specified in the algorithm (recent bid values can be those having occurred with respect to a particular impression consumer or a group of related impression consumers over the last hour, day, number of days, week, month, or other period); and "user_mean" is a market valuation for each user derived from the external valuation value (i.e., an exponential moving average of the external valuation) and, in some cases, a previous user mean value above as specified in the algorithm.

In the case where the user is identifiable but there is no previous record of the user/seller pair, a default user mean value can be assigned. As shown, the speed of the moving average can be optimized by selecting weights (thetas) in the moving average calculation. In practice, the optimal values for theta0 and theta1 appear to be similar across advertising platform members, publishers, and time and, as such, there do not necessarily need to be updated frequently or have different values for each platform member. However, log level data should be periodically sampled to verify the stability of the coefficients. In one simulation example, the formula to calculate user value above works well when theta0=0.8.

Generally, a calculated user value can be associated with an identified user (or user-seller pair) and stored for later use in a moving average of user value (as used above, the "external_valuation" and "user_mean" values can be stored). In some instances, however, certain users cannot be reliably identified over time (using cookies, fingerprinting, or other identification method) and, as such, a moving average of the value of those users cannot be reliably determined. In one implementation, to address this issue, unidentifiable users can be grouped in categories based on known information (e.g., by geography and/or inventory), and the user values of the group(s) can be calculated over time. As such, unidentifiable users in the USA can be valued differently than unidentifiable users in Mexico, which can drive higher yield for publishers.

In some implementations, calculated user values are shared among all or subsets of impression sellers. In this manner, sellers who share user data are able to recognize the value of a user (and capture an appropriate amount of revenue) even if the seller has not previously been exposed to the user. Without data sharing among sellers, an impression buyer can avoid paying a high price to advertise to a high value impression consumer by waiting until the consumer visits a website of an impression seller that has no data or insufficient data about the consumer, and therefore is unaware of the consumer's value. If, however, the advertising platform provides the impression seller with user value data derived from cooperating members, the seller can set an auction floor price that accounts for the high value of the consumer.

Determining Optimal Floor Algorithm Coefficients

In one implementation, in order to reduce the amount of calculation that needs to be performed in real-time on an impression by impression basis while ensuring accuracy over the long-term, the various coefficients (betas) used in calculating the optimal floor value can be determined and optimized offline. Accordingly, a computational algorithm can use historical bid data to find the beta values of the optimal floor equation. In the present example, the computational algorithm includes three main elements: a floor function, a revenue function, and coefficient learning.

The floor function takes exogenous features of each auction and uses them as inputs to produce a floor value. Generally, this can be represented as:

floor[$i,p$]=beta0[$p$]+beta1[$p$]*attribute1[$i$]+ . . . +beta$N$[$p$]*attribute$N$[$i$]

The i indices indicate values that change per auction, while the beta coefficients are at the publisher level (thus the p index). In the above equation, the beta values are scalar numbers to be optimized at the publisher or placement level. The determination of these optimized values can be performed periodically (e.g., daily, sub-daily, weekly, etc.). The attributes refer to features that represent an auction. In one specific example, attributes that generate acceptable results on sampled data include the user value moving average, inventory session frequency, and EAP. Thus, the floor in each auction i is:

floor[$i,p$]=beta0[$p$]+beta1[$p$]*user_mean[$i$]+beta2[$p$]*external_valuation[$i$]+beta3[$p$]*ln(inventory_frequency[$i$]+beta4[$p$]*ln(inventory_frequency[$i$])$^2$+beta5[$p$]*eap[$i$]

The "user_mean" and "external_valuation" values are those as described in the user value algorithm, above. Inventory session frequency, represented as "inventory_frequency," refers to the number of times an impression consumer and seller pair has arrived over a given interval (e.g., 24 hours). Additional features representative of an auction are contemplated for use in determining a floor value, such as, user values measured at the publisher and tag level, external valuation and user mean normalized by ECP instead of EAP, inclusion of the second highest bid in calculation of the user mean and external valuation, including the volatility of bids per user, quadratic terms to capture non-linear relationships between features and bid values, tag identifier, media type, hour of day, and so on.

The revenue function refers to how revenue changes as a function of the bids and the floor that is applied. In one instance, this can be envisioned as second price auction revenue (SPAR) function, "spar," or, in another instance, a smoothed, continuous approximation of the foregoing, "approx_spar," which uses an approximation of the sigmoid function and its integral to calculate a smooth hypothetical revenue. The degree of similarity between the spar and approx_spar functions is controlled by "alpha," a smoothing parameter. Example definitions of each function are as follows:

def spar(floor, bid1, bid2, private_value):
  if bid1[i]<floor[i]:
    auction_revenue[i]=private_value
  elif bid2[i]>floor[i]:
    auction_revenue[i]=bid2[i]
  else:
    auction_revenue[i]=floor[i]
  return auction_revenue[i]
def approx_spar(floor, bid1, bid2, private_value, alpha):

asq=alpha**2 return(bid2+(0.5*(sqrt((floor−bid2)**2*asq+1)/alpha+
    (floor−bid2)))−(0.5*(sqrt((floor−bid1)**2*asq+
    1)/alpha+(floor−bid1)))−(bid1−private_value)*
    (0.5*(floor/bid1−1)*alpha/sqrt(1+((floor/bid1−
    1)*alpha)**2)+0.5))

As used in the functions above, "floor" is the reserve price or hard floor, "bid1" is the highest eligible external bid, "bid2" is the second highest eligible bid, "private_value," is the value of the impression if not sold, and "alpha" is a smoothing parameter.

The "approx_spar" function is useful as compared to the "spar" function because it allows the optimal coefficients to be determined in a scalable manner. Using the "spar" function is, instead, computationally expensive as it involves finding the optimal reserve price over a group of auctions by summing the "spar" functions over those auctions and finding the optimal reserve price in that group of auctions using a brute force search. Further, the approximation approach can use any set of descriptors of an auction to improve the floor calculation. For example, if it is later determined that hour of the week is an important predictor of bid density, that variable can be added to the solution. It should be appreciated that there are many possible ways to approximate a SPAR function, and the algorithm described above is just one manner of doing so.

Figure 3C:
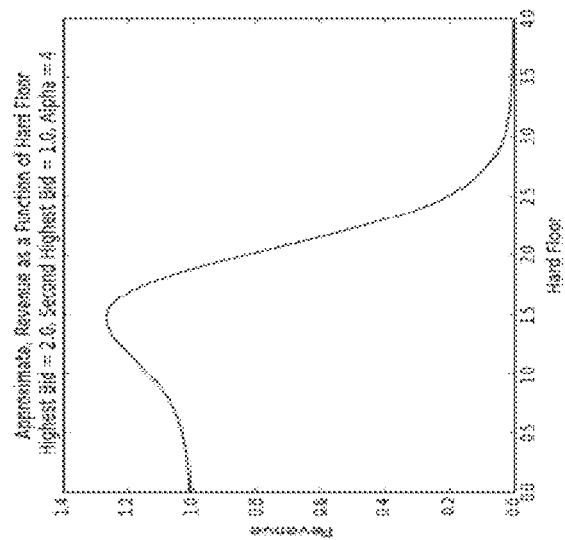
FIGS. 3A-3C are graphs depicting revenue as a function of a hard floor in an example auction.
Figure 3B:
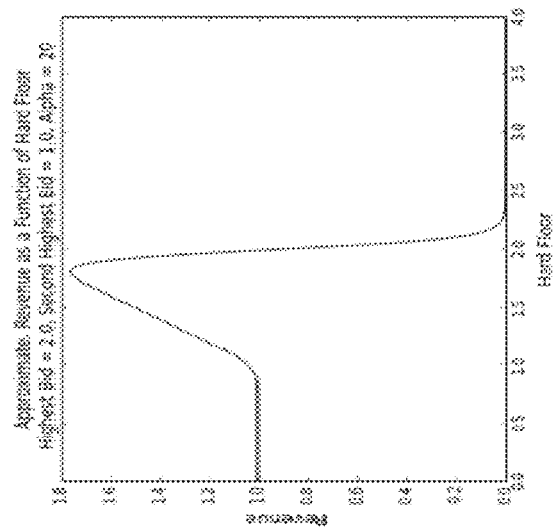
Figure 3A:
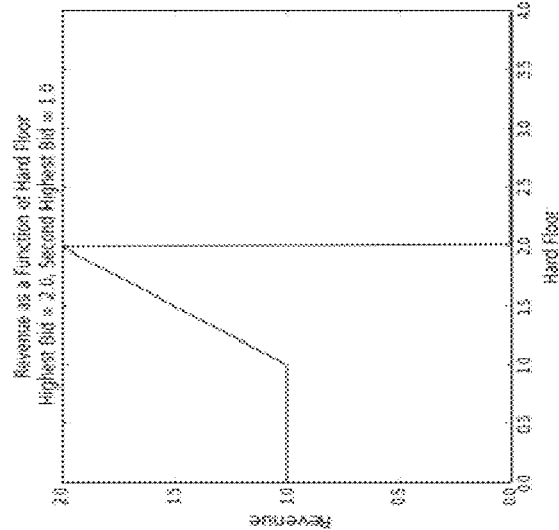

FIGS. 3A-3C are graphs of examples of the "spar" and "approx_spar" functions for a single auction with fixed highest and second highest bids and a private value of 0.

Each graphs shows how revenue changes as a function of the hard floor that is implemented. FIG. 3A depicts seller revenue using the "spar" function which is, in essence, a definition of how a second price auction works. If the hard floor is less than the second highest bid, the revenue is the second highest bid. If the hard floor is between the first and the second price, the revenue is the hard floor and, if the hard floor is above the highest bid, the revenue is the private value, which is zero. However, the "spar" function is problematic for machine learning: the discontinuity when the reserve price just exceeds the highest bid is not differentiable and a piece-wise linear approximation of the function when summed together produces many local minima (the sum of the piecewise spars is not convex or quasi-convex).

These issues are addressed by the "approx._spar" function, shown in FIGS. 3B and 3C, where the abrupt changes in the "spar" function are smoothed using an approximation of the sigmoid function. In mathematical notation, this implementation of the function is:

$$b2 + 0.5\left(\frac{\sqrt{(r-b2)^2 a^2 + 1}}{a} + (r-b2)\right) -$$

$$0.5\left(\frac{\sqrt{(x-b1)^2 a^2 + 1}}{a} + (x-b1)\right) -$$

$$(b1 - p)\left(0.5\left(\frac{x}{b1} - 1\right) * \frac{a}{\sqrt{1 + \left(\left(\frac{x}{b1} - 1\right)a\right)^2}} + 0.5\right)$$

The two graphs in FIGS. 3B and 3C show how the exactness/smoothing of the function can be changed through the alpha parameter, i.e., the higher the alpha, the closer the approximation. An exact approximation is not ideal for machine learning because it increases the likelihood of local minima. In practice, an alpha between 5 and 10 provides approximately the same optimal value as the exact SPAR but is much faster to optimize.

In the third element, the optimal coefficients (betas) are learned on historical data given the floor and revenue functions. Machine learning techniques can be utilized to find the values for all betas that would have maximized revenue. That is, given a floor equation, it is necessary to learn the coefficients that minimize the sum of cost functions (−1*approx_spar). For example, the betas can be determined using batch minimization techniques like l_bfgs_b or online using stochastic gradient descent. In either case, the derivative of the "approx_spar" function is found in order to calculate the gradient or stochastic gradient.

In one implementation, optimization of the floor equation coefficients can be performed with reference to the pseudocode below. The "approx_gradient" function takes the following arguments: (1) floor: the reserve price or hard floor, (2) bid1: the highest eligible external bid, (3) bid2: the second highest eligible bid (internal or external), (4) private_value: the value of the impression if not sold, (5) feature_values: a data structure containing auction features used in determining the floor value (e.g., user mean value, etc.), and (6) alpha: a smoothing parameter. The function returns an array having a length equivalent to the number of feature values.

def approx_gradient(floor, feature_values, bid1, bid2, private_value, alpha):

asq=alpha**2 approx_derivative=

(−(0.5*alpha*bid1*(bid1 − private_value)/(((asq + 1)*bid1**2 −

2*asq*bid1*floor + asq*floor**2)* sqrt(asq*(floor/bid1 − 1)**2 + 1))) − (0.5*

(alpha*(floor − bid1)/(sqrt(asq*(bid1 − floor)**2 + 1)) +

1)) +

(0.5*(alpha*(floor − bid2)/(sqrt(asq*(bid2 − floor)**2 + 1)) + 1)))

return approx_derivative*feature_values features_values=auctions['constant','user_mean, 'external_valuation''eap','log_frequency', 'log_frequency2']
warm_stat_betas=[0.1, 0.35, 0.45, 0.1, −0.1, 0.0]
learning_rate=0.0001
beta[p]=warm_start_betas
for i in auctions[p] (repeat forever):

floors[i]=feature_values[i].dot(beta[p])

beta[p]=beta[p]−learning_rate*−1 approx_gradient (floors[i],feature_values[i],bid1[i],bid2[i],alpha=10)

In the above pseudocode, feature_values[i].dot(beta[p]) is the dot product of beta and the feature values, i.e., the floor in each auction. The beta values are then based on approx_gradient. In mathematical notation, the approx_derivative is:

$$-\frac{0.5ab1(b1-p)}{((a^2+1)b1^2 - 2a^2b1x + a^2x^2)\sqrt{a^2\left(\frac{x}{b1}-1\right)^2 + 1}} - 0.5\left(\frac{a(x-b1)}{\sqrt{a^2(b1-x)^2 + 1}} + 1\right) +$$

$$0.5\left(\frac{a(x-b2)}{\sqrt{a^2(b2-x)^2 + 1}} + 1\right)$$

Because the approximate SPAR function is not convex, this procedure is not guaranteed to find a global minimum. However, the coefficients found using gradient based methods and those using an exhaustive grid search of the coefficient space typically yield similar results. Indeed, analysis indicates that finding betas using the approximate SPAR function and its gradient is more efficient and stable than non-gradient based methods that use SPAR, because methods using SPAR either find bad local minima or spend a substantial amount of time finding the global minima. In practice, typical values that would maximize revenue are approximately: beta0=0.05+/−0.025 and beta1+beta2=0.80+/−0.1, beta3=−0.09, beta4=0.06, and beta5=0.1.

Test Results

Figure 4:
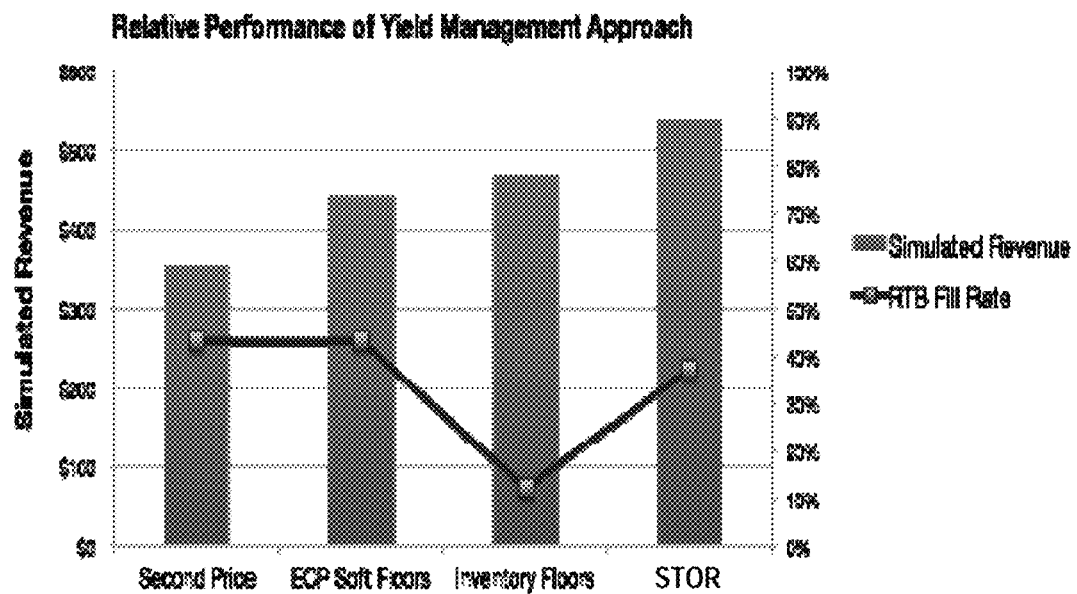
FIGS. 4 and 5 are graphs depicting test results of the techniques described herein.

The STOR algorithm was applied to actual data and the results were compared with three baselines: 1) a pure second price auction, 2) auctions using ECP as a soft floor, and 3) inventory floors, in which different floors are set for different placements based on the value that approximately maximizes revenue for a given placement (or combination of placement, geo, and hour). As shown in FIG. 4, the STOR algorithm produced both higher total revenue and higher fill rate than inventory floors or ECP soft floors.

Figure 5:
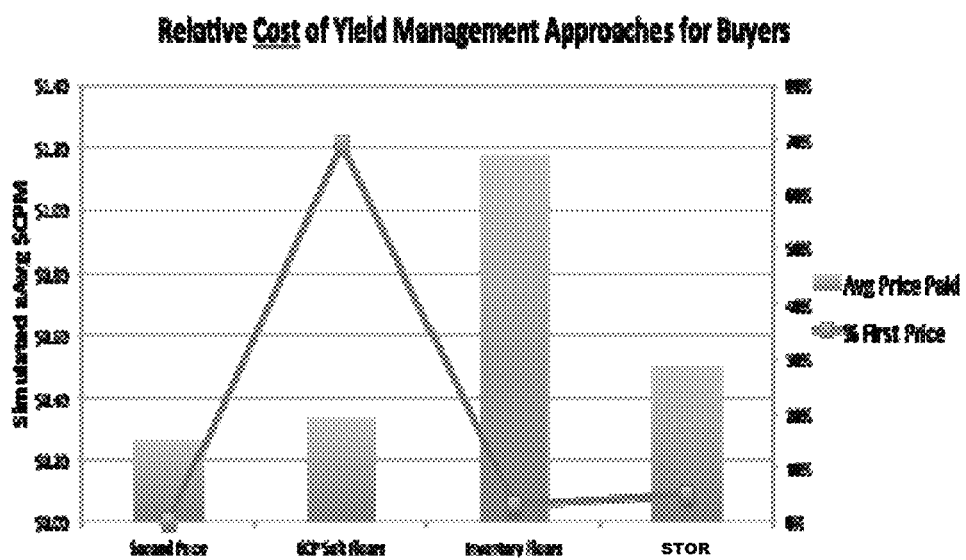

Notably, there are several desirable aspects of this algorithm for buyers as well. In particular, as shown in FIG. 5, delivery is higher and average price paid is lower than when using inventory floors. In addition, compared to soft floors, far fewer buyers are paying the first price in an auction. Accordingly, the present techniques typically reduce the average price of impressions for buyers.

Example Architecture

Figure 6:
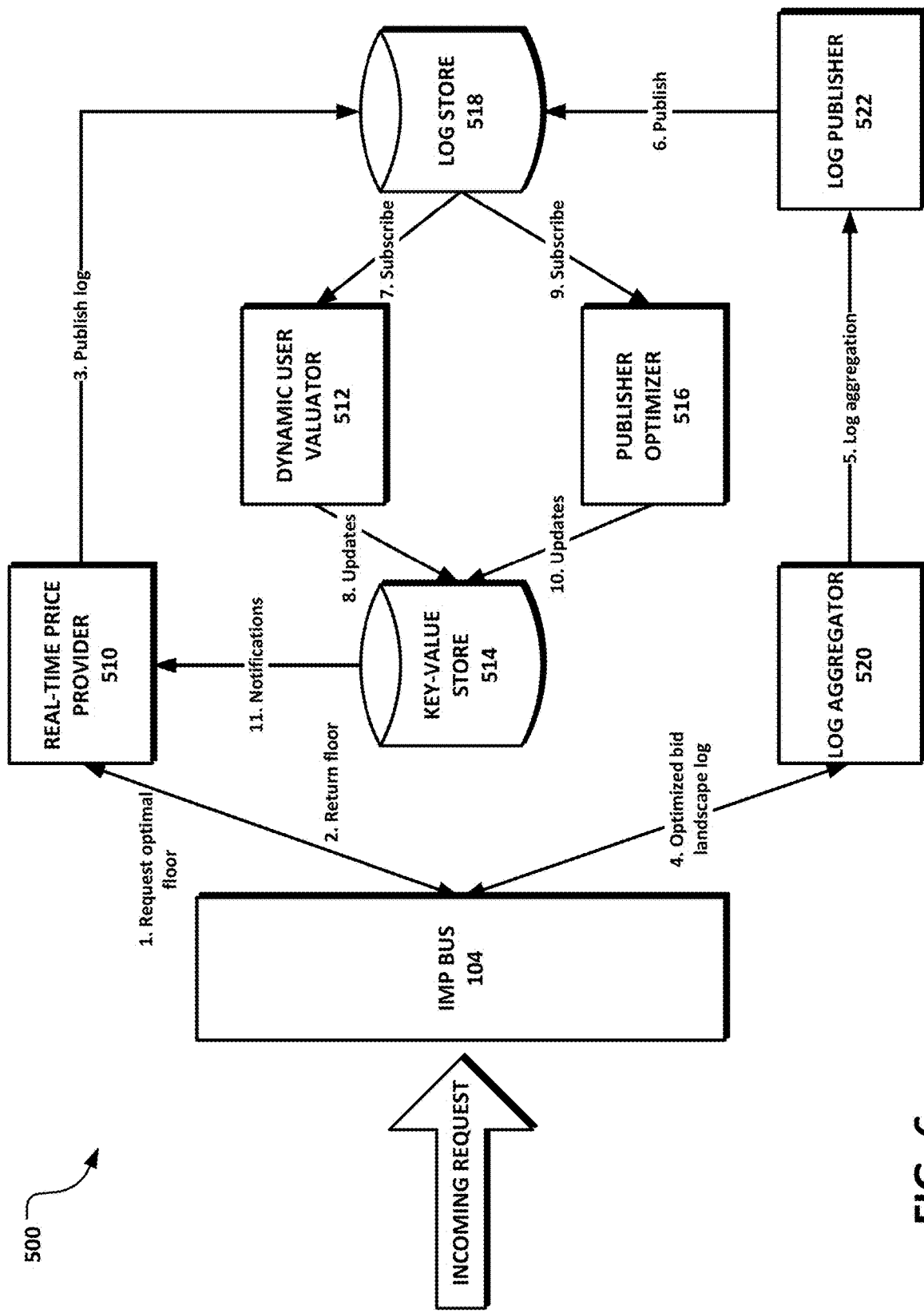
FIG. 6 is a high-level system architecture diagram of components of an online advertising platform with support for dynamic floor price calculation according to an implementation.

FIG. 6 depicts an example system 500 in an online advertising platform that implements the optimal floor calculation techniques described herein. One implementation of the system 500 and software services associated therewith includes the following: (1) an application programming interface (API) and user interface (UI) service to activate floor optimization; (2) a bid landscape log; (3) a Dynamic User Valuator 512 for calculation of the moving average of bids on the user ("user_mean"), the most recent bids on a user ("external_valuation"), and user-member frequency ("inventory_frequency"), using data streamed from Log Store 518; (4) a Publisher Optimizer 516 that performs an optimization job to calculate floor value coefficients (e.g., betas described above); (5) a low latency key-value store 514 to store the "user_mean", "external_valuation", "inventory_frequency", and beta values; and (6) a Real-time Price Provider 510 that receives information about an impression from the Imp Bus 104 and returns a floor price.

In some implementations, floor optimization is an optional feature of the advertising platform and, thus, can be enabled and disabled using the API/UI service. A user can also use the API/UI service to indicate for which auctions floor optimization should be enabled. The bid landscape log is a data feed provided by the Imp Bus 104 to allow for the calculation of user values and beta values. The log can be created separately from other logs used by the advertising platform. Thus, in the case where logs are formed as tables in a database, the use of a separate log level table avoids having to reference or join multiple tables to retrieve the data needed for floor optimization. The bid landscape log can be provided by the Imp Bus 104 to a Log Aggregator 520, which forwards the log level data into a data processing pipeline. Log Publisher 522 ingests the aggregated log data and publishes it to Log Store 518, which can be in the form of a database subscribed to by Dynamic User Valuator 512 and Publisher Optimizer 516.

To use floors that are computed at the impression level with a linear equation, the Imp Bus 104 makes a request to Real-time Price Provider 510 during an RTB auction and, in response to the request, receives the optimal calculated floor value. The optimal floor request describes the auction to Real-time Price Provider 510 using, e.g., an auction identifier, a publisher identifier, seller identifier, ad tag identifier, user identifier, EAP, geography, and/or other information. Real-time Price Provider 510 uses the combination of user identifier and seller identifier as a key in a low latency Key-Value Store 514 to retrieve the values calculated by the Dynamic User Valuator 512, and uses the publisher identifier as a key in the Key-Value Store 514 to retrieve the coefficient values calculated by the Publisher Optimizer 516. With these retrieved values, Real-time Price Provider 510 calculates the optimal floor for the auction, depending on whether the user is new, has no associated cookie (or is otherwise unidentifiable), or has valid user data (as described above). Real-time Price Provider 510 can also feed the calculated floor back to the Log Store 518 for use in further calculations. Using this architecture, the system 500 is able to perform the user mean and optimal floor calculations in real time (e.g., during an RTB auction) or substantially real time (e.g., within a few seconds or minutes after an RTB auction). Real-time Price Provider 510 can operate as a plug-in or other type of switchable component such that third parties can provide their own pricing providers that utilize alternative logic than that provided by the online advertising platform.

As noted above, the Dynamic User Valuator 512 is responsible for calculating the "user_mean", "external_valuation", and "inventory_frequency" values. Because demand can vary greatly across users and can change quickly, it becomes necessary to calculate and write a dynamic "user_mean" associated with each user-seller pair if optimal floors are enabled. The Dynamic User Valuator 512 subscribes to the log data feed from Log Store 518, calculates the abovementioned values, and continuously or periodically updates the Key-Value Store 514 with the calculated values. Likewise, Publisher Optimizer 516 subscribes to the log data feed from Log Store 518, calculates the floor value coefficients, and continuously or periodically updates the Key-Value Store 514 with the calculated values. In some implementations, the coefficients (betas) are not instantly updated after each auction; i.e., there can be an update lag or other form of asynchronous operation.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A method comprising:
   tracking, by an advertising platform of a processing system including a processor, over a plurality of historical, real-time bidding auctions, bids to serve advertisements to different impression consumers, the advertising platform comprising server hardware configured to execute the real-time bidding auctions for impression inventory;
   calculating over time, by the advertising platform, for each different impression consumer, a respective value of that impression consumer based on the bids to serve advertisements to that impression consumer;
   storing, by the advertising platform, values of the different impression consumers in a data store accessible to the advertising platform in real-time during the real-time bidding auctions;

receiving, by the advertising platform, a request, at the advertising platform, for an advertisement to be served to an impression consumer of the different impression consumers;

in response to the request, executing, by the advertising platform, a real-time bidding auction to serve the advertisement to the impression consumer;

during the real-time bidding auction, by the advertising platform:

retrieving the respective value of the impression consumer stored in the data store;

adjusting the respective value of the impression consumer according to an impression consumer bias to obtain a biased respective value;

modifying the biased respective value according to an attribute of the impression consumer to obtain a modified, biased respective value; and calculating a maximum floor price for the real-time bidding auction based at least in part on the modified, biased respective value of the impression consumer and one or more attributes associated with the real-time bidding auction, wherein calculating the maximum floor price comprises respectively applying a plurality of scalar coefficients obtained from a low-latency data store to the biased respective value of the impression consumer and the one or more attributes including applying a particular scalar coefficient of the plurality of scalar coefficients to an inventory session frequency, and wherein the inventory session frequency comprises a number of times the impression consumer has been paired with a particular impression seller over a particular time period;

identifying an aggressiveness value;

adjusting the maximum floor price according to the aggressiveness value; and offline from the real-time bidding auction, by the advertising platform:

determining values for the plurality of scalar coefficients that, as part of calculating the maximum floor price, result in calculating an optimal floor price that maximizes revenue; and storing the plurality of scalar coefficients in the low-latency data store.

2. The method of claim 1, wherein the value of the impression consumer comprises (i) a value of the impression consumer to a single impression seller or (ii) a value of the impression consumer to a plurality of impression sellers.

3. The method of claim 1, wherein the value of the impression consumer is calculated based at least in part on one or more recent bids to serve an advertisement to the impression consumer.

4. The method of claim 1, wherein the attribute of the impression consumer is based on one of a demographic segment to which the impression consumer belongs, a geographic location of the impression consumer, or a browsing history of the impression consumer, and wherein the one or more attributes associated with the real-time bidding auction comprise one or more of time, day, publisher, average price of the impression consumer, advertisement viewing history of the impression consumer, browsing history of the impression consumer, and inventory characteristics.

5. The method of claim 1, wherein calculating the value of a particular impression consumer further comprises:

receiving, by the advertising platform, an indication that the particular impression consumer cannot be uniquely identified;

identifying, by the advertising platform, a geography associated with the particular impression consumer; and determining the value of the particular impression consumer based on a value of other unidentified impression consumers associated with the geography.

6. The method of claim 1, wherein the maximum floor price comprises a hard floor, and wherein the aggressiveness value comprises a manually set aggressiveness value.

7. The method of claim 1, wherein calculating the value of a particular impression consumer further comprises calculating, by the advertising platform, in substantially real time a moving average based on a current user value and one or more previously determined user values.

8. The method of claim 1, wherein the value of a particular impression consumer is calculated based in part on a highest bid price and a second-highest bid price from bids received in one or more previous real-time bidding auctions.

9. The method of claim 8, further comprising calculating, by the advertising platform, a weighted average of the highest bid price and the second-highest bid price, and wherein the value of the particular impression consumer is determined based in part on the weighted average.

10. The method of claim 1, wherein calculating the maximum floor price further comprises determining, by the advertising platform, a function that maximizes revenue based at least in part on the value of the impression consumer and the one or more attributes associated with the real-time bidding auction, and wherein the impression consumer bias is further based on a technical attribute of a creative.

11. The method of claim 10, wherein the revenue is determined based on a second price auction function, and wherein the technical attribute of the creative comprises one of a file type of the creative, a size of the creative, or a mode of display of the creative.

12. The method of claim 1, wherein the maximum floor price is calculated in real time during the real-time bidding auction.

13. A system comprising:

an advertising platform of a processing system including a processor; and a memory that stores executable instructions that, when executed by the processing system facilitate performance of operations, the operations comprising:

tracking, by the advertising platform, over a plurality of historical, real-time bidding auctions, bids to serve advertisements to different impression consumers;

calculating over time, by the advertising platform, for each different impression consumer, a respective value of the impression consumer based on the bids to serve advertisements to that impression consumer;

storing values of the different impression consumers in a data store accessible to the advertising platform in real-time during the real-time bidding auctions;

receiving a request, at the advertising platform, for an advertisement to be served to an impression consumer of the different impression consumers;

in response to the request, executing, by the advertising platform, a real-time bidding auction to serve the advertisement to the impression consumer;

during the real-time bidding auction, by the advertising platform:

retrieving a calculated value of the impression consumer stored in the data store;

adjusting the respective value of the impression consumer according to an impression consumer bias to obtain a biased respective value of the impression consumer;

modifying the biased respective value according to an attribute of the impression consumer to obtain a modified, biased respective value; and calculating a maximum floor price for the real-time bidding auction based at least in part on the modified, biased respective value of the impression consumer and one or more attributes associated with the real-time bidding auction, wherein calculating the maximum floor price comprises respectively applying a plurality of scalar coefficients obtained from a low-latency data store to the biased respective value of the impression consumer and the one or more attributes including applying a particular scalar coefficient of the plurality of scalar coefficients to an inventory session frequency, and wherein the inventory session frequency comprises a number of times the impression consumer has been paired with a particular impression seller over a particular time period; and offline from the real-time bidding auction, by the advertising platform;

identifying an aggressiveness value;

adjusting the maximum floor price according to the aggressiveness value;

determining values for the plurality of scalar coefficients that, as part of calculating the maximum floor price, result in calculating an optimal floor price that maximizes revenue; and storing the plurality of scalar coefficients in the low-latency data store.

14. The system of claim 13, wherein the value of the impression consumer comprises (i) a value of the impression consumer to a single impression seller or (ii) a value of the impression consumer to a plurality of impression sellers.

15. The system of claim 13, wherein the value of the impression consumer is calculated based at least in part on one or more recent bids to serve an advertisement to the impression consumer.

16. The system of claim 13, wherein the one or more attributes associated with the real-time bidding auction comprise one or more of time, day, publisher, average price of the impression consumer, advertisement viewing history of the impression consumer, and browsing history of the impression consumer.

17. The system of claim 13, wherein calculating the value of a particular impression consumer further comprises:

receiving an indication that the particular impression consumer cannot be uniquely identified;

identifying a geography associated with the particular impression consumer; and determining the value of the particular impression consumer based on a value of other unidentified impression consumers associated with the geography.

18. The system of claim 13, wherein the maximum floor price further comprises a hard floor.

19. The system of claim 13, wherein calculating the value of a particular impression consumer further comprises calculating in substantially real time a moving average based on a current user value and one or more previously determined user values.

20. The system of claim 13, wherein the value of a particular impression consumer is calculated based in part on a highest bid price and a second-highest bid price from bids received in one or more previous real-time bidding auctions.

21. The system of claim 20, wherein the operations further comprise calculating a weighted average of the highest bid price and the second-highest bid price, and wherein the value of the particular impression consumer is determined based in part on the weighted average.

22. The system of claim 13, wherein calculating the maximum floor price further comprises determining a function that maximizes revenue based at least in part on the value of the impression consumer and the one or more attributes associated with the real-time bidding auction.

23. The system of claim 22, wherein the revenue is determined based on a second price auction function.

24. The system of claim 13, wherein the maximum floor price is calculated in real time during the real-time bidding auction.

* * * * *